United States Patent
Haughn (10) Patent No.: US 8,626,143 B2
(45) Date of Patent: Jan. 7, 2014

(54) MOBILE DEVICE MANAGEMENT THROUGH AN OFFLOADING NETWORK

(75) Inventor: Erick John Haughn, Norcross, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 24 days.

(21) Appl. No.: 13/364,257

(22) Filed: Feb. 1, 2012

(65) Prior Publication Data

US 2012/0135719 A1 May 31, 2012

Related U.S. Application Data

(63) Continuation of application No. 12/143,959, filed on Jun. 23, 2008, now abandoned.

(51) Int. Cl.
*H04M 3/00* (2006.01)

(52) U.S. Cl.
USPC .......................................... 455/418; 455/456.1

(58) Field of Classification Search
USPC .......................... 455/418–420, 456.1–456.6; 717/168–178
See application file for complete search history.

(56) References Cited

U.S. PATENT DOCUMENTS

| | | | |
|---|---|---|---|
| 2003/0022661 A1* | 1/2003 | Guterman | 455/418 |
| 2004/0073901 A1* | 4/2004 | Imamatsu | 717/170 |
| 2005/0132115 A1 | 6/2005 | Leach | |
| 2005/0181776 A1 | 8/2005 | Verma et al. | |
| 2006/0286937 A1* | 12/2006 | Russell et al. | 455/67.11 |
| 2008/0040713 A1 | 2/2008 | Subbakrishna et al. | |
| 2008/0153422 A1 | 6/2008 | Gilbertas et al. | |
| 2008/0310324 A1 | 12/2008 | Chaponniere | |

OTHER PUBLICATIONS

OA dated Aug. 25, 2011 for U.S. Appl. No. 12/143,959, 24 pages.
3GPP TS 23.234 V7.7.0 (Jun. 2008) 3rd Generation Partnership Project; Technical Specification Group Services and System Aspects; 3GPP system to Wireless Local Area Network (WLAN) interworking; System description (Release 7).

* cited by examiner

*Primary Examiner* — Ajit Patel
(74) *Attorney, Agent, or Firm* — Turocy & Watson, LLP (57) ABSTRACT

System(s) and method(s) are provided for management of content in a mobile device. Content can be firmware associated with mobile functionalities, or data a mobile can process. To effect a content update, a first network platform that serves a multimode mobile device through a first radio access network (RAN) can facilitate establishment of an end-to-end tunnel to the multimode through a second RAN associated with a second network platform; the first network platform can then push the content update to the multimode mobile through the second RAN. Typically the second RAN employs a distinct radiofrequency band than the first RAN; thus the content update is offloaded from traffic in the first wireless network. Content updates can be signaled through the first RAN and implemented upon end-to-end tunnel establishment to the first network platform through the second RAN. Moreover, said updates can be scheduled according to a network-configured subscriber update profile.

20 Claims, 9 Drawing Sheets

MOBILE DEVICE MANAGEMENT THROUGH AN OFFLOADING NETWORK

CROSS-REFERENCE TO RELATED APPLICATIONS

This application is a Continuation application of application Ser. No. 12/143,959 filed Jun. 23, 2008, the entire contents of which are hereby incorporated herein by reference.

TECHNICAL FIELD

The subject innovation relates to wireless communications and, more particularly, to utilization of an offloading network for management of a mobile device.

BACKGROUND

In wireless telecommunication, access to radiofrequency (RF) spectrum is regulated. Even in instances in which a RF band can be utilized for wireless operation without a license, like the 2.4 GHz Industrial, Scientific and Medical band, frequency resources remain limited. In addition, transmission power for a network transmitter is regulated. Accordingly, wireless telecommunication development focuses on efficient approaches to maximize utility, e.g., maximize a number of served subscribers within finite resources, without deteriorating subscriber perceived quality of service. Regardless peculiarities of pursued approaches, a leading design principle is to improve traffic utilization to ensure capacity of a network, its wireless link in particular, by effectively multiplexing information while mitigating unwarranted signaling and overhead.

Among overhead incurred by a service provider is transmission of firmware over-the-air (FOTA) updates typically necessary for maintenance and improvement of wireless device performance, a mobile device manufacturers steadily update device portfolio with novel devices an associated novel device code or firmware. Large service providers or network operators can manage FOTA updates for a substantive number (e.g., $10^5$-$10^9$) of devices, thus incurring significant undesired overhead on the provider's wireless link when updates are effected. Therefore, efficient approaches to mobile device management can improve traffic conditions in a wireless link and further service provider or network operator utility.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject innovation provides system(s) and method(s) for management of content in a mobile device. Content can be firmware associated with functionalities of the mobile device, or data the mobile device can consume such as multimedia (e.g., video and sound). In an aspect of the subject innovation, management of content can refer to implementation of necessary (e.g., security patches) or desired (e.g., add-on capabilities) content update(s). To implement a content update, a first network platform that serves a multimode mobile device through a first radio access network (RAN) can facilitate establishment of an end-to-end secure tunnel to the multimode mobile device through a second RAN associated with a second network platform; the first network platform can then push the content update to the multimode mobile through the second RAN. Typically the second RAN employs a distinct radiofrequency band than the first RAN; thus the content update is offloaded from traffic in the first wireless network.

In another aspect of the subject innovation, content updates (e.g., firmware updates) can be signaled through the first RAN and implemented upon establishment of an end-to-end tunnel to the first network platform through the second RAN. Moreover, said updates can be scheduled according to a network-configured subscriber update profile.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," "service," "framework," "interface," "node," and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inferences based on complex mathematical formalisms) which can provide simulated vision, sound recognition, and so forth.

Figure 1:
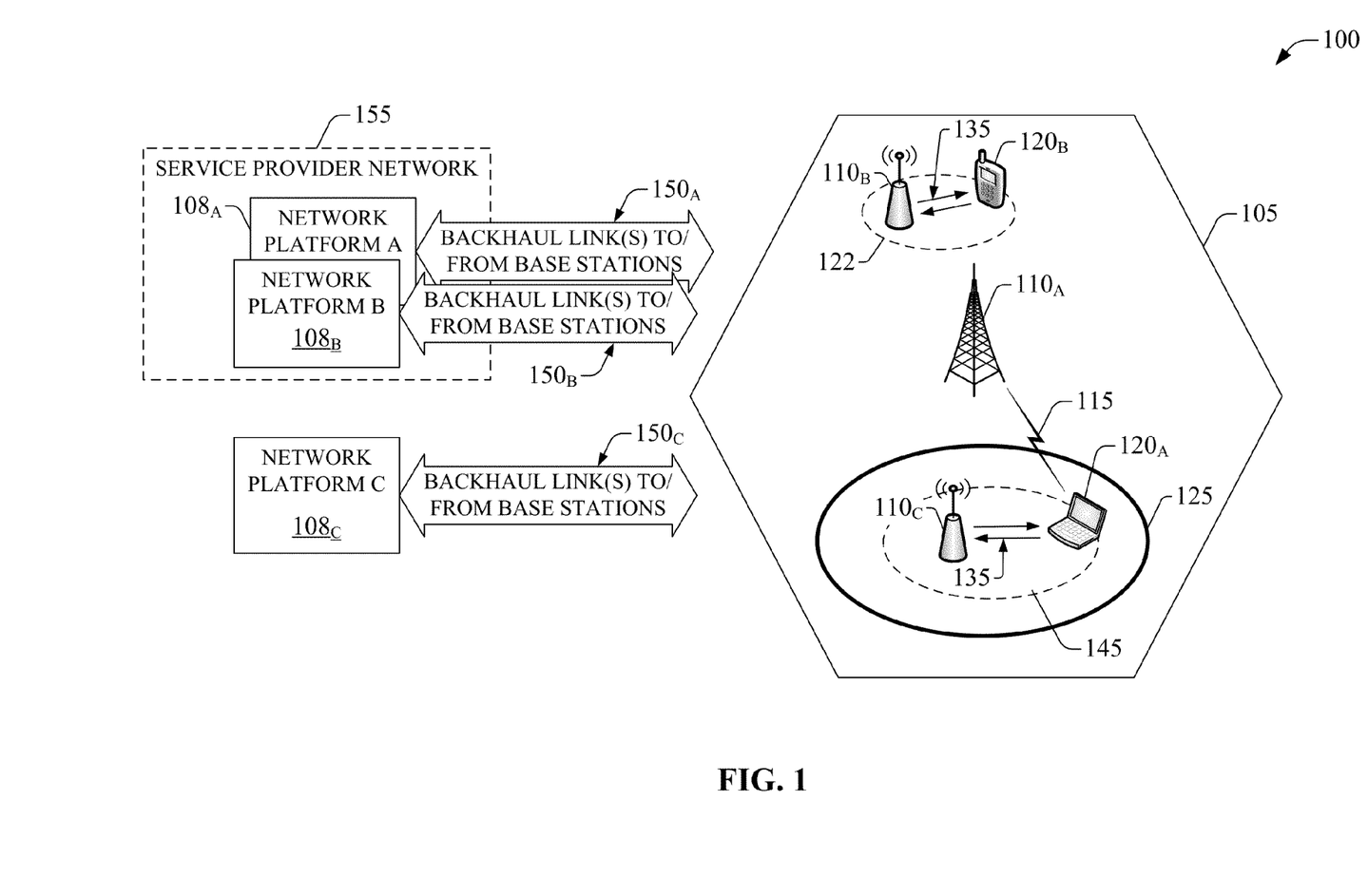
FIG. 1 illustrates a schematic wireless environment in accordance with aspects described in the subject specification.

Referring to the drawings, FIG. 1 illustrates a schematic wireless environment (e.g., a network) 100 in accordance with aspects described in the subject specification. In wireless environment 100, area 105 represents a coverage cell served by a base station 110 over the air; e.g., wireless link 115, which comprises a forward link (FL) and a reverse link (RL), illustrates communication among terminal $120_A$ and base station 110. As an example, mobile $120_A$ can be a 3GPP Universal Mobile Telecommunication System (UMTS) mobile phone. Area 105 is referred herein as a "macro" cell. Macro coverage is generally intended for outdoor locations. It is noted that a base station, its associated electronics, and a wireless link operated in accordance to the base station form a radio access network (RAN), or radio access. Wireless link can utilize a licensed RF spectrum band. In addition, base station 110 communicates via backhaul link(s) $150_A$ a network platform A $108_A$, which in cellular wireless technologies (e.g., 3rd Generation Partnership Project (3GPP) Universal Mobile Telecommunication System (UMTS), Global System for Mobile Communication (GSM)) represents a core network. It should be appreciated network platform A $108_A$ also communicates with other base stations (not shown) that serve other cells. Backhaul link(s) $150_A$, and links $150_B$ and $150_C$ as well, can include a wired backbone link (e.g., optical fiber backbone, twisted-pair line, T1/E1 phone line, a digital subscriber line (DSL) either synchronous or asynchronous, an asymmetric ADSL, or a coaxial cable . . . ).

Generally, network platforms $108_A$-$108_C$ include components, e.g., nodes, gateways, and interfaces, that facilitate packet-switched (PS) (e.g., internet protocol (IP)) and circuit-switched (CS) traffic and control generation for network communication. Network platform C $108_C$ can be operated by a disparate entity from the one that operates network platforms A $108_A$ and B $108_B$; as illustrated in example environment 100, a single service provider network 155 manages operation of both networks $108_A$ and $108_B$. In wireless environment 100, a more localized area of coverage 122 is served by access point 110B. Area 122, and substantially any other confined area within macro cell 105, is referred herein as a "micro" cell—depending on the wireless technology, a micro cell can be referred by a more specific term like "hot spot" in case of Wi-Fi. In an aspect, AP $110_B$ can communicate with terminal 120B via FL/RL 135. As an example, terminal $120_B$ can be a 3GPP UMTS device with a subscriber identity module (SIM) card. Such communication can be afforded at least in part by network platform B $108_B$ which is functionally coupled, or linked, to AP 110C via backhaul link(s) $150_B$. Typically, micro cell 122 is intended for indoor service, even though AP $110_B$ can also service an confined outdoor area. A set of confined areas 125 and 145 are served by access point 110, which can communicate with access terminal 120C via FL/RL 135. Larger area 125 can include outdoor coverage (e.g., a parking lot) while smaller area 145 can be an indoor area such as a building, either residential or business-type (e.g., a library, a hospital, a retail store, a residence . . . ). Network platform C $108_C$ can facilitate, at least in part, such communication. Typically, coverage areas 122, and 145 and 125 are determined at least in part by transmission power of APs 110B and 110C, respectively, as well as path loss, shadowing, and so forth. Each of access point $110_E$ and $110_C$ generally serve a few (e.g., 1-5) wireless devices (e.g., subscriber station 120B) within confined coverage areas 145 or 122.

It is to be noted that terminal $120_A$ can be a multimode user equipment in order to communicate with base station $110_A$ and access point $110_E$ when network platform A $108_A$ and network platform B $108_B$ operate in accordance with disparate wireless technology specification. Likewise, access terminal $120_C$ can also be a multimode user equipment. Alternatively, depending on device capability and wireless technology of a first base station (e.g., AP $110_B$) and a second base station (e.g., Node B $110_A$), a mono-mode terminal can be served within a macro cell 105 and a micro cell. As a subscriber station, e.g., UE $120_A$, enters micro coverage (e.g., area 125), UE $120_A$ can attempt to attach to AP 110C through transmission and reception of attachment signaling, effected via a FL/RL 135. In an aspect, attachment signaling can include a Location Area Update (LAU) and/or Routing Area Update (RAU), or substantially any micro cell synchronization procedure compatible with the wireless technology (e.g., Wi-Fi, Worldwide Interoperability for Microwave Access (WiMAX), Enhanced General Packet Radio Service (Enhanced GPRS), Long Term Evolution (LTE), Ultra Mobile Broadband (UMB), Zigbee) associated with the micro cell. Moreover, as operation of access point (e.g., AP 110) that serves micro cell can be facilitated by a core network (e.g., network platform C 108) that is distinct from a core network (e.g., network A 108$_A$) that operates, at least in part, base station (e.g., Node B 110$_A$) that serves macro cell, attachment procedures and signaling can include establishment of an end-to-end tunnel or substantially any interfaced access link among the mobile station and the core network that supports macro. Attachment attempts can be triggered by predetermined operation conditions of UE 120$_A$, such as when an firmware update is pending for the user equipment and micro-coverage signal, e.g., from AP 110$_C$, is detected. When an attachment attempt is successful, incoming traffic (e.g., voice and data) for mobile station can be routed to the subscriber through the radio access network associated with the micro cell, e.g., AP 110$_C$ and link 135 which can transmit in an unlicensed or licensed RF spectrum band that is distinct from the RF band employed by macro RAN associated with macro network platform A 108$_A$, and thus traffic can be offloaded from macro cell. It is to be noted that, in an aspect of the subject innovation, a multimode mobile station need not be handed over from macro to micro cell in order for at least a portion of traffic to be re-routed.

It should be appreciated that a service provider network, e.g., service provider network 155, can include a first network platform (e.g., network platform A 108$_A$) that operates, at least in part, a first RAN, and a second network platform (e.g., network platform A 108$_A$) that operates at least in part a second RAN; thus, traffic offload from the first network to the second network, via attachment from the first RAN to the second RAN, can be refined through exchange of operational information among the network platforms, such as location services, subscriber(s) information, radio access network conditions, and so forth. In an aspect of the subject innovation, the first network platform is termed "serving" network platform and the second network platform is termed "offloading" network platform.

Figure 2:
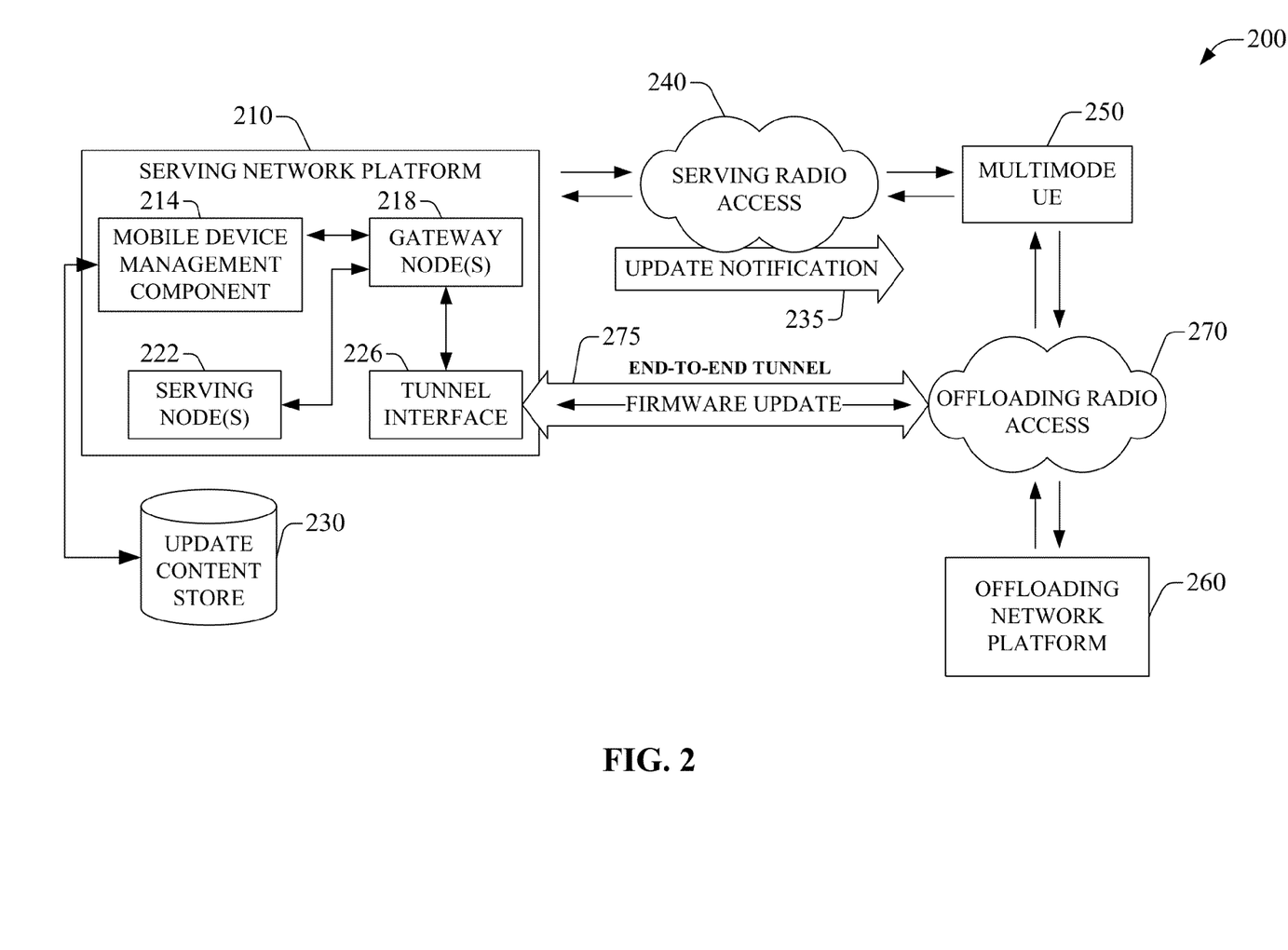
FIG. 2 is a high-level block diagram of an example system that facilitates mobile device management through an offloading network in accordance with aspects disclosed herein.

FIG. 2 is a high-level block diagram of an example system 200 that facilitates mobile device management through an offloading network. In system 200, a serving network platform 210 communicates with a multimode UE 250 via serving radio access 240 which comprises a base station (e.g., base station 110; not shown in FIG. 1) and a communication platform (e.g., antennas, transceivers and associated electronic circuitry, a processor, a memory . . . ) in addition to wireless links. In addition, an offloading network platform 260, which includes offloading radio access 270, can also telecommunicate with multimode UE 250; the radio access 270 includes access point(s) in addition to wireless links. It is to be noted that serving radio access 240 and offloading radio access 270 takes place over disparate radiofrequency (RF) resources, wherein radio access for serving network platform is effected through a licensed RF band (e.g., personal communication services (PCS), advanced wireless services (AWS), general wireless communications service (GWCS)) and offloading network platform 260 implemented through a non-licensed RF band such as the 2.4 GHz industrial, medical and scientific (IMS) band or one or more of the 5 GHz set of bands.

In an aspect of the subject innovation, serving network platform 210 includes a mobile device management (MDM) component 214 which provides data services (e.g., applications) that can be executed via a wireless application protocol (WAP), and facilitate administration of subscriber station(s); for instance, such administration includes open mobile alliance device management (OMA DA) commands (e.g., retrieve device model, manufacturer, type, original equipment manufacturer (OEM), firmware version, hardware version, or international mobile equipment identity (IMEI)), firmware updates in accordance to available update content (e.g., security patches; drivers for add-on or new mobile's functionalities; activation of services like internet protocol (IP) television, video- and sound-streaming; adjustment of user equipment operation such as an switch from utilization of static modulation and code rate to adaptive modulation and code rate) in update content store 230. In another aspect, serving network platform 210 includes gateway node(s) 218 which interface services such as those provided via mobile device management component 214 and service node(s) 222 which conveys packetized flows of information, or data streams. As an example, in a 3GPP UMTS network, gateway node(s) 218 can be embodied in gateway GPRS support node (s) (GGSN), while serving node(s) 222 can be embodied in serving GPRS support node(s) (SGSN). In addition, serving network platform 210 can include a tunnel interface 226 (e.g., tunnel termination gateway (TTG) in 3GPP UMTS network (s)) which can facilitate packetized communication with disparate wireless network(s), such as offloading network platform 260, through gateway node(s) 218. In a 3GPP UMTS network(s), gateway node(s) (e.g., GGSN) and tunnel interface (e.g., TTG) comprise a packet date gateway (PDG).

When a firmware update becomes available within serving network platform 210, an update notification 235 is conveyed to multimode UE 250; typically, MDM component 214 can generate such notification. Update notification 235 can be embodied in an email, an instant message (IM), a short message service (SMS Wakeup/WAP Push) communication, a ringtone or another predetermined sound, and the like. In addition, to the latter high-level formats, an update notification 235 can be a low-level indication (e.g., an M-bit word, with M a positive integer) signaled in a control channel. It should be appreciated that a low-level indication to update firmware can be employed to trigger an update when a set of one or more predetermined conditions (e.g., attachment to an offloading network platform 260) are satisfied. In an aspect of the subject innovation, in response to update notification 235, multimode UE 250 can establish an end-to-end tunnel 275 to communicate with serving network platform 270 through offloading network platform 260, and associated offloading radio access 270, in order to receive a firmware over-the-air (FOTA) update in connection with update notification 235. At least three advantages of utilization of offloading radio access 270 to receive a firmware update are to (i) relieve traffic over serving network platform 210 and thus make efficient use of radio resources, in particular when a substantive number (e.g., $10^5$-$10^9$) of subscriber stations are to be updated; (ii) improve end user experience or perceived quality of service due to coverage and capacity afforded by offloading network platform radio resources; and (iii) significant RAN build out cost savings.

In an aspect of the subject innovation, tunnel interface 226 in conjunction with gateway node(s) 218 can form a packet data gateway (PDG) that facilitates establishment of end-to-end tunnel 275. Communication associated with establishment of the end-to-end tunnel 275 occurs via offloading radio access 270. For instance, multimode UE 250 can resolve a wireless access point name (W-APN) through offloading network platform, which can include a domain name server (DNS) to at least that end; alternative, or in addition, offloading network platform can resolve W-APN via an internet service provider (ISP) functionally coupled to offloading network platform 260. Once W-APN has been resolved, multimode UE 250 can request serving network platform 210 a secure tunnel to tunnel interface, such request can be performed, for example, through Internet Key Exchange Protocol (IKE). Tunnel interface 226 can grant access and establish the secure tunnel, e.g., an Internet Protocol (IP) security (IPsec) tunnel. It should be appreciated that the granted tunnel offers a secure conduit for traffic communication among the tunnel interface 226 and multimode UE 250; however, traffic is not associated with a specific data service.

To exploit a granted secure tunnel for dedicated traffic associated with a specific data service (e.g., firmware update(s), data upload for on-the-cloud storage or web hosting) at serving network platform 210, multimode UE 250 can request the specific data service to tunnel interface 226. In response to this request, tunnel interface 226 can create a packet data protocol context (PDP) associated with multimode UE 250, and conveys a PDP context request to gateway node(s) 218 to attach multimode UE 250 to serving network platform 210. Gateway node(s) 218 (e.g., GGSN in a 3GPP Core Network) requests authorization from serving network platform 210, e.g., through an authentication component (not shown) which can implement remote authentication dial-in user service (RADIUS). Upon authentication is effected, gateway node(s) 218 accepts PDP and assigns a private IP address and port for mobile UE 250—e.g., PDP for mobile UE 250 is created. Creation of the subject PDP establishes, or creates, end-to-end tunnel 275.

It is to be noted that utilization of end-to-end tunnel 275 to received data through offloading network platform 260 is not limited to firmware updates, substantially any data service that conveys a substantive volume of data, or content, can be implemented in accordance with aspects described herein. As an example, an end-to-end tunnel 275 can be established in order for an end user to receive data recovery services, in which backup data previously generated by a subscriber and stored by serving network platform 210 can be transmitted to one or more multimode subscriber stations (e.g., multimode UE 250). As another example, serving network platform 210 can exploit a low-level update notification 235 in order to prompt multimode UE 250 to establish an end-to-end tunnel 275 upon attachment to offloading network platform 260 in order for a subscriber to receive advertisement, service coupons, promotional campaigns, and the like.

It should be appreciated that a processor (not shown), memory (not shown), and other electronic circuitry (not shown) can effect the functionality of substantially all components, nodes and interfaces in serving network platform 210, offloading network platform 260, and serving network access 240 and offloading network access 270 as well.

Figure 3:
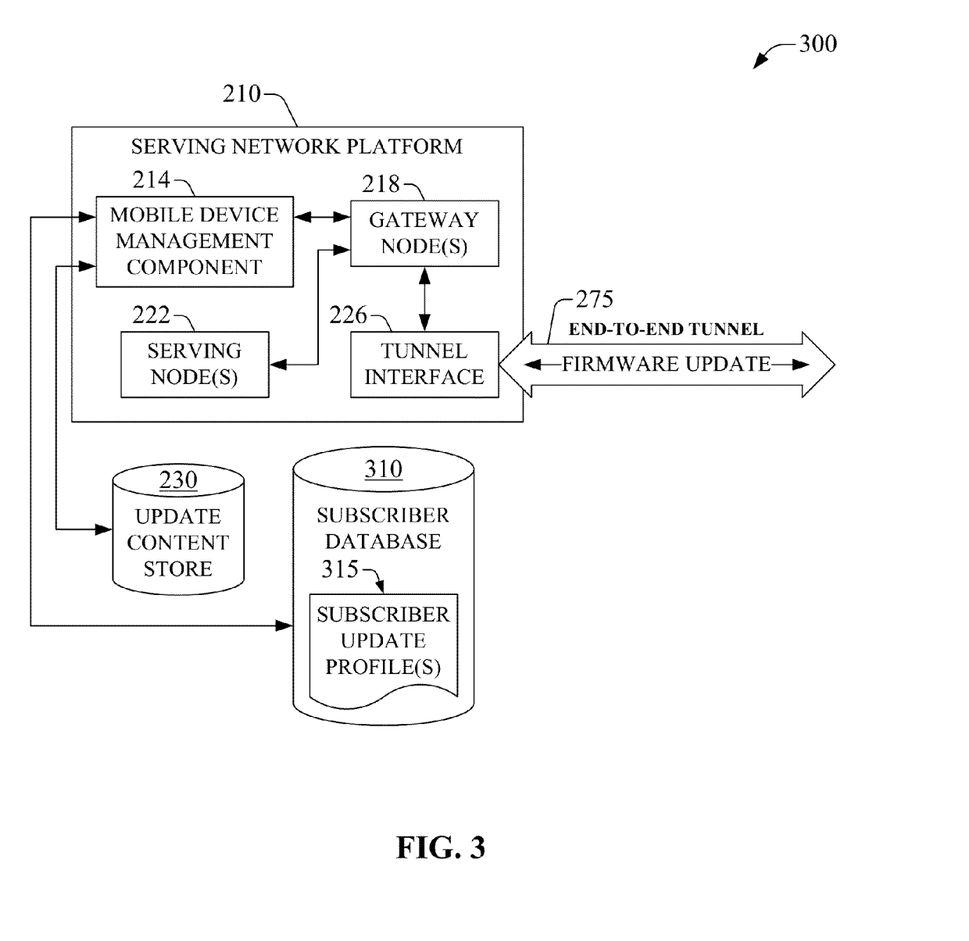
FIG. 3 is a block diagram of an example system that facilitates a firmware update in accordance with aspects disclosed in the subject identification.

FIG. 3 is a block diagram of an example system that facilitates a firmware update in accordance with a subscriber update profile. Components in illustrative system 300 with like numerals to those in example system 200 have like functionality. Generally, a subscriber can update firmware in a plurality of (i) scenarios, (ii) modalities, and (iii) preferences. With respect to (i), updates can be notified by serving network platform 210 in an instance with poor channel conditions associated with offloading network platform, or excessive load in an area of coverage for offloading network platform; thus, a firmware update can be inefficient, in particular for substantive updates (e.g., O(1-10 MBs)). In addition, multiple firmware updates and add-ons can be implemented based on service standards such as agreed quality of service (QoS), mobile station features like antenna configuration and availability of multi-mode operation at a receiver. In connection with (ii), a subscriber can respond interactively to a notification to update firmware, or the subscriber can tend to ignore such notifications, in which case a batch mode update can be substantially more efficient. For (iii), a subscriber can prioritize certain updates, such as for example security firmware patches can be given an elevated priority compared to updates related to other applications like gaming, planner and scheduling, and so forth. In addition, subscriber can specify time intervals on which a firmware update is to be attempted. To manage or plan updates, a subscriber can generate an update profile 315 in accordance with aspects (i) through (iii) and store it in a subscriber database 310 which can be a part of serving network platform 210.

It should be appreciated, as discussed above, utilization of offloading network platform and offloading radio access is advantageous for serving network platform 210 since traffic is offload from radio resources that can be devoted to traffic; therefore, operator of serving network platform 210 can reward subscriber(s) to configure subscriber update profile(s) 315. In aspect of the subject innovation, a reward can include delivery of firmware for add-on features for a subscriber's mobile, differentiated rating for a predetermined time interval configured by the service provider, a credit of communication units such as voice minutes, a set of one or more coupons for ringtones, songs, video snippets, etc., storage space for subscriber's data like contact(s) list, emergency phone numbers, and so forth. It is to be noted that such reward scheme is neither provider-centric nor subscriber-centric since both parties benefit from utilization of subscriber update profile(s) 315 or substantially any other update planning instrument.

Figure 4:
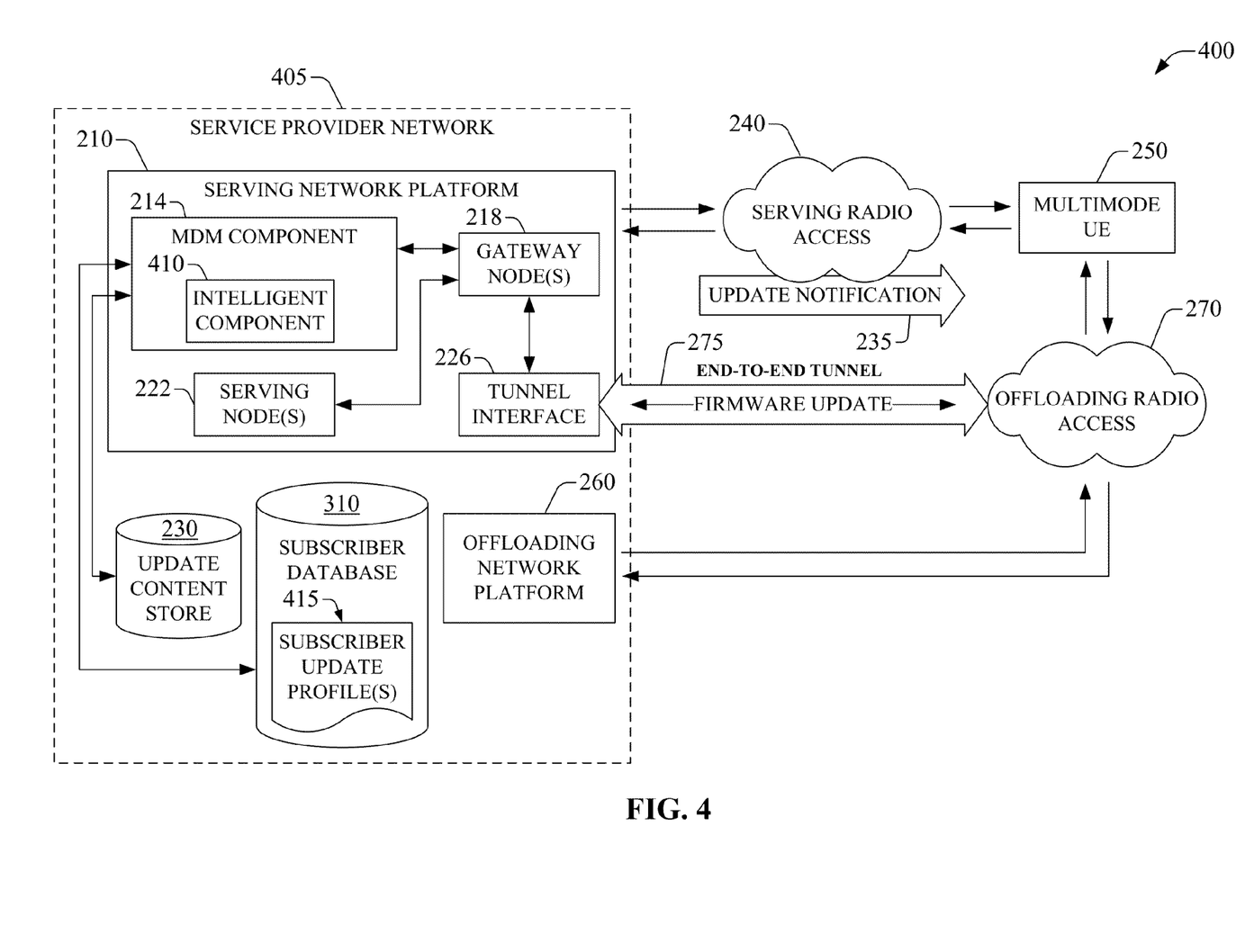
FIG. 4 is a block diagram of an example system that facilitates mobile device management in accordance with aspects described herein.

FIG. 4 is a block diagram of an example system 400 that facilitates mobile device management through an offloading network. Components in illustrative system 400 with like numerals to those in example system 300 have like functionality. In an aspect of example system 400, a service provider network 405 comprises serving network platform 210 and offloading network platform 260. Through operation of both network platforms, a service provider can advantageously coordinate firmware updates of a multimode UE 250 via end-to-end tunnel 275. In an aspect of the subject innovation, an intelligent component 410 within MDM component 214, can generate a usage pattern (not shown) of serving radio access 240 and offloading radio access 270 for a multimode 250 in order to create subscriber update profile(s) 415. Such profile can exploit geographic deployment information of access points included in offloading radio access 270, and location information of multimode UE 250 gleaned through serving network platform 210 in order to infer instance(s) in which multimode UE 250 is within a coverage area of offloading network platform 260. Once multimode UE 250 is inferred to be able to retain a telecommunication through offloading radio access 270, an update notification 235 can be conveyed to multimode UE 250, which can employ the notification to trigger attachment to offloading network platform 260 and establish an end-to-end tunnel 275 to receive a firmware update.

Additionally, a generated usage pattern (not shown) can include an inferred time interval $\Delta t$ that multimode UE 250 lingers within coverage area of offloading radio access 270. Knowledge of $\Delta t$ can facilitate MDM component 214 to select firmware update content that can likely be pushed successfully to multimode UE 250. It is to be noted that MDM component 214 can refine a selection of firmware update content through utilization of quality of radio link for multimode UE 250 in offloading radio access 270 in combination with inferred Δt. For example, if radio link or channel conditions in offloading radio access are deemed to be good, aggressive packet segmentation, and modulation and code rate can be employed to push a firmware update. However, if channel conditions are fair or poor a more conservative packet fragmentation, and modulation and code rate can be appropriate; thus, upload of a smaller firmware update can be possible within Δt.

To generate a usage pattern of offloading radio access 270, or offloading network platform 260, intelligent component 410 can collect information on attachment to offloading network 260, and location of access points and time span of an attachment thereto, by multimode UE 250 over a predetermined period of time (e.g., a week, a month, a quarter). Location of access points can be extracted from AP location area code/routing are code (LAC/RAC) in combination with offloading network platform 260 deployment available to service provider. It is to be noted that intelligent component 214 can also utilize substantially any information stored in subscriber database 310. Collected attachment and time span information can be employed by intelligent component 410 to reason or draw conclusions about, e.g., infer, a usage pattern of offloading radio access 270 and associated linger times. With respect to linger times Δt, intelligent component 410 an set a threshold below which time spans are removed from usage patter analysis, since short time spans can reflect attachment to offloading radio access 270 due to excessive AP signaling. To infer such usage pattern, analyzer 225 can rely on artificial intelligence techniques, which apply advanced mathematical algorithms—e.g., decision trees, neural networks, regression analysis, principal component analysis (PCA) for feature and pattern extraction, cluster analysis, genetic algorithm, and reinforced learning—to collected attachment information.

In particular, intelligent component 410 can employ at least one of numerous methodologies for learning from data and then drawing inferences from the models so constructed, e.g., Hidden Markov Models (HMMs) and related prototypical dependency models, more general probabilistic graphical models, such as Dempster-Shafer networks and Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. The foregoing methods can be applied to, to generate usage pattern(s), which includes linger time intervals.

It is to be appreciated that firmware update over-the-air through an offloading network platform 260 that is operated by a same service provider that operates service network platform 210 further improves end user experience with respect to firmware update through an offloading network operated by a disparate provider: Generation of usage pattern affords a more effective utilization of radio resources, which typically results in improved radio capacity, and mitigates possible service disruption associated with interactive update notification(s).

Figure 5:
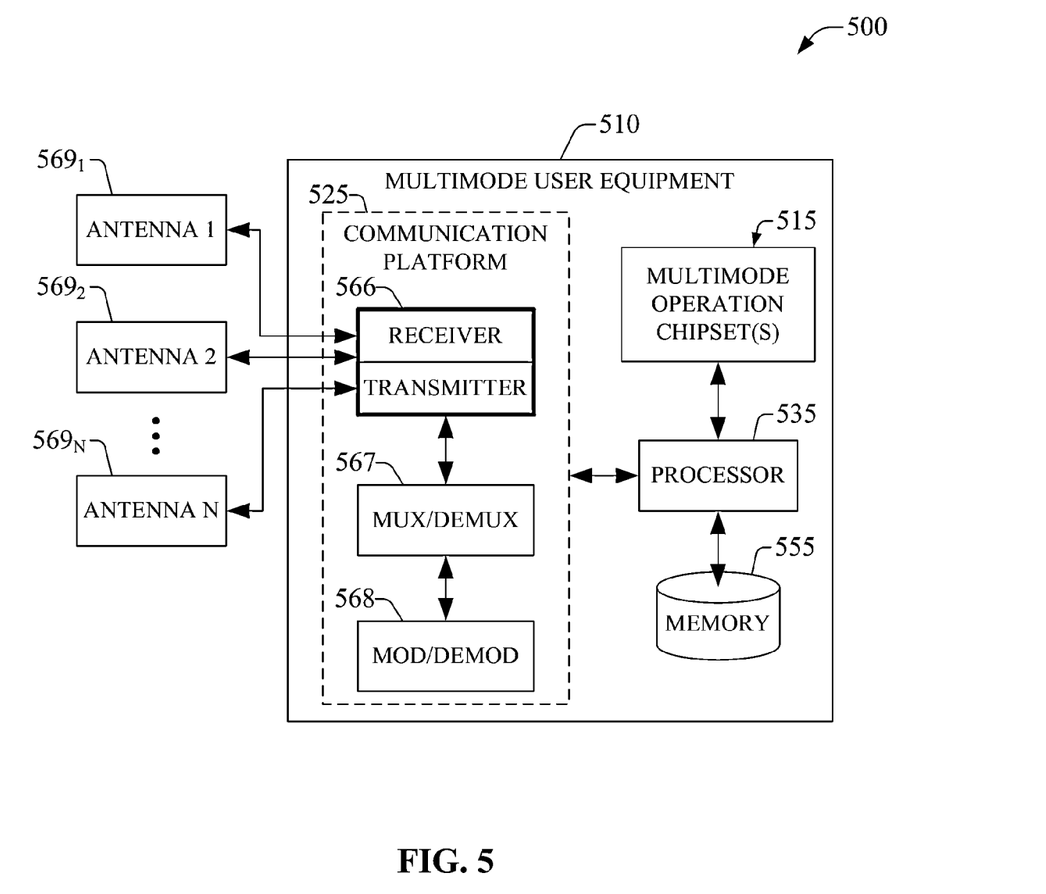
FIG. 5 is a block diagram of an example multimode access terminal that operates in accordance with aspects disclosed in the subject specification.

To provide further context for various aspects of the subject specification, FIG. 5 illustrates a block diagram of an example embodiment 500 of a multimode user equipment 510 that can exploit firmware update, and substantially any other content management, via an offloading network (e.g., offloading network platform 260 and offloading radio access 270) in accordance with aspects described herein.

Multimode UE 510, through a set of antennas $569_1$-$569_N$, can receive and transmit signal(s) from and to wireless devices like access points, access terminals, wireless ports and routers, and so forth, that operate in a radio access network, e.g., serving radio access 240 or offloading radio access 270. It should be appreciated that while antennas $569_1$-$569_N$ are a part of communication platform 525, which comprises electronic components and associated circuitry that provides for processing and manipulation of received signal(s) and signal(s) to be transmitted. In an aspect, communication platform 525 includes a receiver/transmitter 566 that can convert signal from analog to digital upon reception, and from digital to analog upon transmission. In addition, receiver/transmitter 566 can divide a single data stream into multiple, parallel data streams, or perform the reciprocal operation. Functionally coupled to receiver/transmitter 566 is a multiplexer/demultiplexer component (mux/demux) 567 that facilitates manipulation of signal in time and frequency space. Electronic component 567 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 567 can scramble and spread information (e.g., codes) according to substantially any code known in the art; e.g., Hadamard-Walsh codes, Baker codes, Kasami codes, polyphase codes, and so on. A modulator/demodulator component (mod/demod) 568 is also a part of communication platform 525, and can modulate information according to multiple modulation techniques, such as frequency modulation, amplitude modulation (e.g., M-ary quadrature amplitude modulation (QAM), with M a positive integer), phase-shift keying (PSK), and the like. In an aspect of embodiment 500, mod/demod 568 is functionally coupled to multiplexer/demultiplexer 567.

In addition, in embodiment 500, multimode operation chipset(s) 515 allows multimode UE 510 to operate in multiple communication modes in accordance with disparate technical specification for wireless technologies. In an aspect, multimode operation chipset(s) 515 utilizes communication platform 525 in accordance with a specific mode of operation. In another aspect, multimode operation chipset(s) 515 can be scheduled to operate concurrently (e.g., when N>1) in various modes or within a multitask paradigm.

In addition, multimode UE 510 includes a processor 535 configured to confer functionality, at least in part, to substantially any electronic component within the multimode UE 510, in accordance with aspects of the subject innovation. As an example, processor 535 can be configured to execute, at least in part, instructions in multimode operation chipset(s) that afford multimode communication through user equipment 510 like concurrent or multitask operation of two or more chipset(s). As another example, processor 535 can facilitate UE 510 to receive instruction code, e.g., firmware, through communication platform 525, and manipulate and execute such instruction code, in addition to store the instruction code and results execution thereof in memory 555. In addition, processor 535 facilitates multimode UE 510 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. Memory 555 can store data structures, code instructions, system or device information like policies and specifications, code sequences for scrambling, spreading and pilot (e.g., reference signal) transmission, frequency offsets, LACs or substantially any other cell IDs, and so on.

In embodiment 500, processor 534 is functionally coupled to memory 555 in order to store and retrieve information necessary to operate and/or confer functionality at least in part to communication platform 525, multimode operation chipset(s) 515, and other operational aspects of multimode user equipment 510.

In view of the example systems described above, example methodologies that can be implemented in accordance with the disclosed subject matter can be better appreciated with reference to flowcharts in FIGS. 6-9. For purposes of simplicity of explanation example method 200 is presented and described as a series of acts; however, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram, or interaction diagram. Moreover, not all illustrated acts may be required to implement a methodology in accordance with the subject specification. Additionally, it should be further appreciated that the methodologies disclosed hereinafter and throughout this specification are capable of being stored on an article of manufacture to facilitate transporting and transferring such methodologies to computers for execution by a processor or for storage in a memory.

Figure 6:
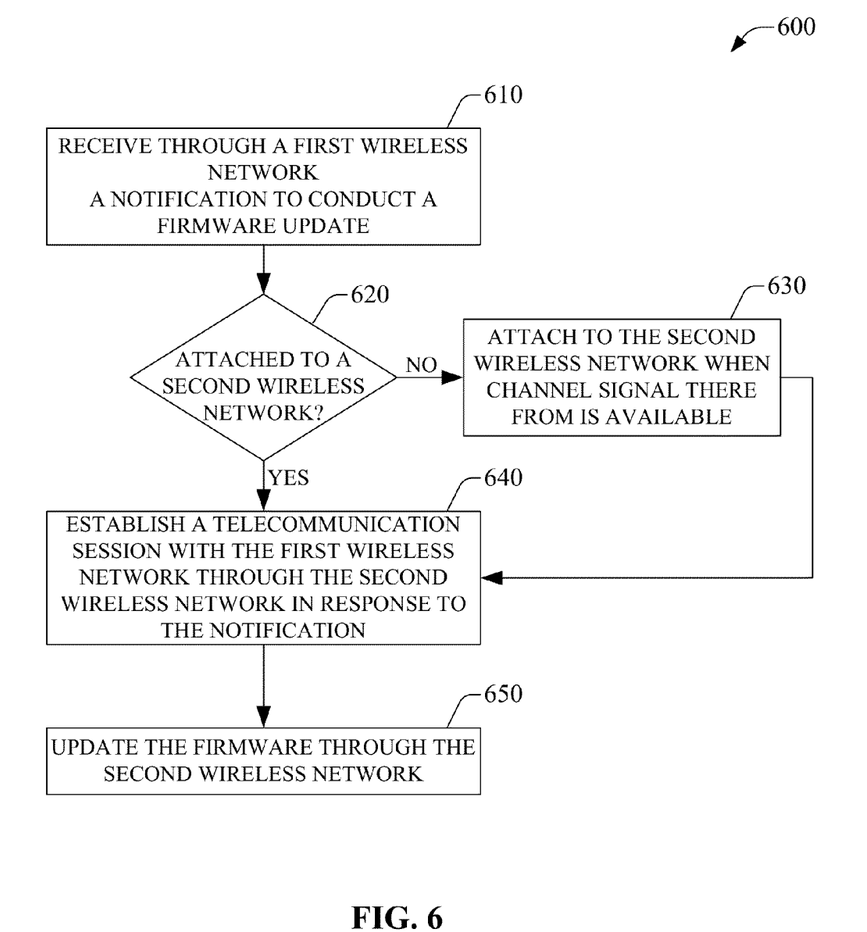
FIG. 6 presents a flowchart of an example method for updating firmware in accordance with aspects of the subject innovation.

FIG. 6 presents a flowchart of an example method 600 for updating firmware in accordance with aspects of the subject innovation. Example methodology is typically carried out by a subscriber station. At act 610, a notification to conduct a firmware update is received through a first wireless network. Such notification can be substantially any message supported by the first network; for instance, the notification can be a short message service (SMS Wakeup/WAP Push) message, a multimedia message service (MMS) message, an email message, an instant message, a predetermined ringtone or sound, and the like. The specific format for the notification can be based on available audiovisual resources (e.g., display size) of a device (e.g., multimode access terminal 250) or a predetermined subscriber update profile. In an aspect, the first wireless network typically operates within a first portion, or band, of a RF spectrum, with a first bandwidth. For example, the first network can be a 3GPP UMTS network. At act 620 it is checked whether the entity that receives a notification to update firmware is attached to a second wireless network. In the affirmative case, flow is directed to act 640, which is discussed below. Conversely, the entity attaches to the second network when signal from the second network is available prior to act 640. To determine whether signal is available, the entity that is to be attached to the second network can scan radio channels known to be utilized for telecommunication in the second network (e.g., one or more of the 14 channels utilized for communication in the 2.4 GHz unlicensed band of IEEE 802.11x network). It should be appreciated that, in an aspect of the subject innovation, the second wireless network utilizes a second band of the RF spectrum that is different from the first band utilized for communication in the first wireless network.

At act 640, a telecommunication session is established with the first wireless network through the second wireless network in response to the notification. In an aspect, such a session is established through a tunnel component interface in the first network platform, the tunnel interface (e.g., TTG in 3GPP UMTS network) grants an end-to-end tunnel among the entity that initiates the session and a data-packet gateway (e.g., GGSN in the 3GPP UMTS network) in the first wireless network. Session is authenticated within the first wireless network, and a unique context is generated for the session.

At act 650, firmware is updated through the second wireless network. It is to be noted that at least one advantage of the effecting an update through the second network is that radio resources of the first network are offloaded by reducing traffic in the first RF band utilized by the first network. An additional advantage is that the second RF band utilized by the second network need not be licensed, in which case operational costs associated with performing an update are reduced.

Figure 7:
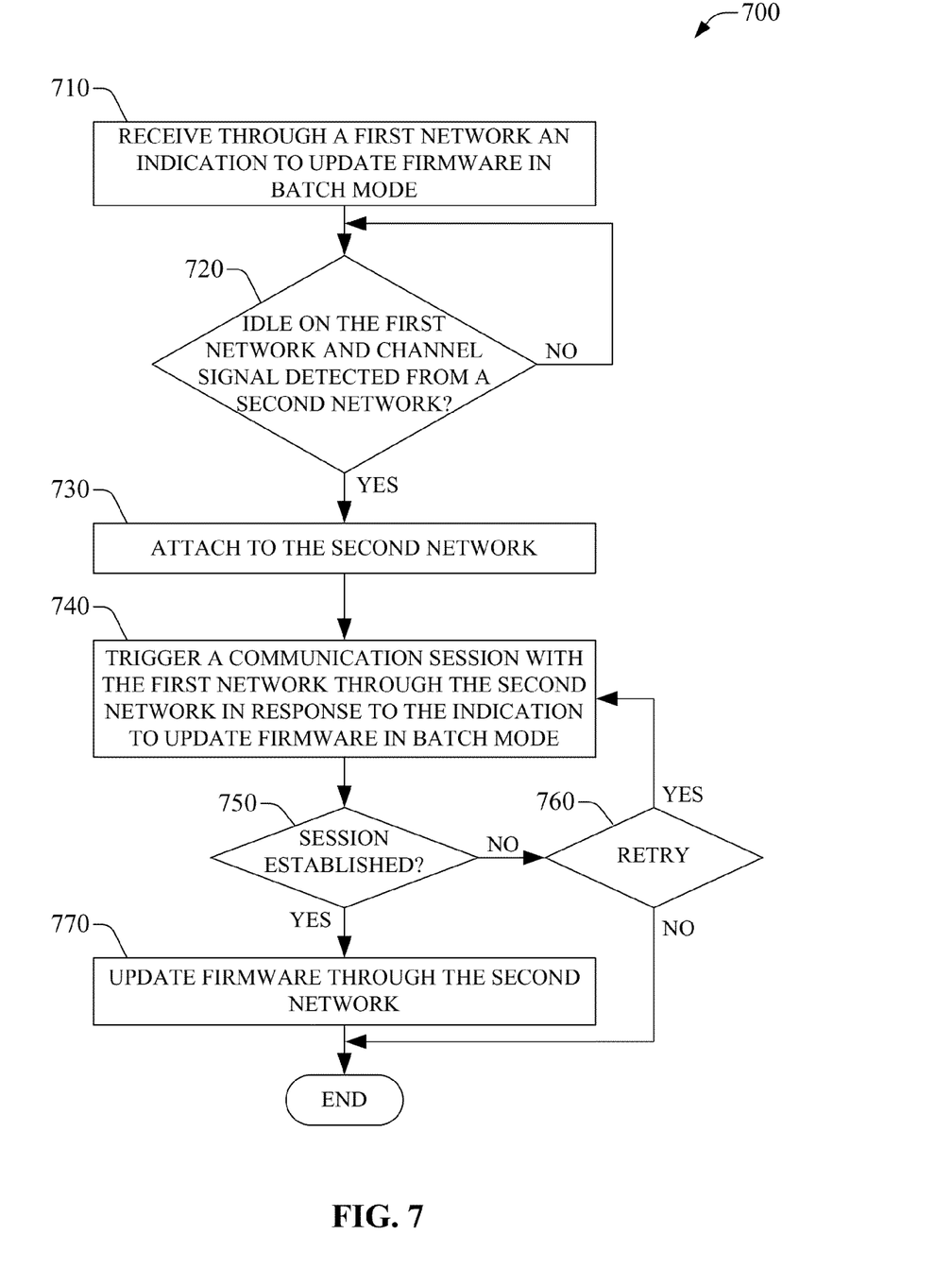
FIG. 7 presents a flowchart of an example method for updating firmware according to aspects of the subject innovation.

FIG. 7 is an example method 700 for updating firmware according to aspects of the subject innovation. At act 710 an indication to update firmware in batch mode is received through a first network. Such an indication can be an L-bit word which can be conveyed in various manners depending on the communication technology utilized by the first network; for instance, the indication can be conveyed in a control channel (for an LTE network, or UMB network), or in a data-packet header field (e.g., in a high-speed downlink packet access (HSDPA) network). The batch mode aspect of the indication has at least the advantage of not implementing an upgrade upon receiving the indication to upgrade. A batch mode upgrade can facilitate a more efficient utilization of radio resources. At act 720, it is checked whether the entity (e.g., a multimode mobile) that receives the indication to update firmware is idle on the first network, e.g., no traffic is communicated, and signal is detected from a second network. Detection of such a signal can be performed through a scanner that probes channel signal strength in the RF band (e.g., 2.4 GHz IMS band) in which the second network operates. In the affirmative case, the entity attaches to the second network. Such attachment typically includes a LAU/RAU procedure as well as fine synchronization with a serving access point that belong to the second network radio access environment. Conversely, the check at act 720 is reenacted.

At act 740, a communication session with the first network through the second network is triggered in response to the batch indication to update firmware. Act 750 is a validation check that probes whether the triggered session was established, e.g., data services are granted by establishing an end-to-end tunnel among the entity that triggered the session and the grantor of the data services. In case session is not successfully established, a new session is retried when a "retry" check in act 760 warrants it, otherwise methodology flow is terminated. When a session is established, firmware is update is updated through the second network, which provides at least the benefit of offloading the first network, and thus improving better service to subscribers.

Figure 8:
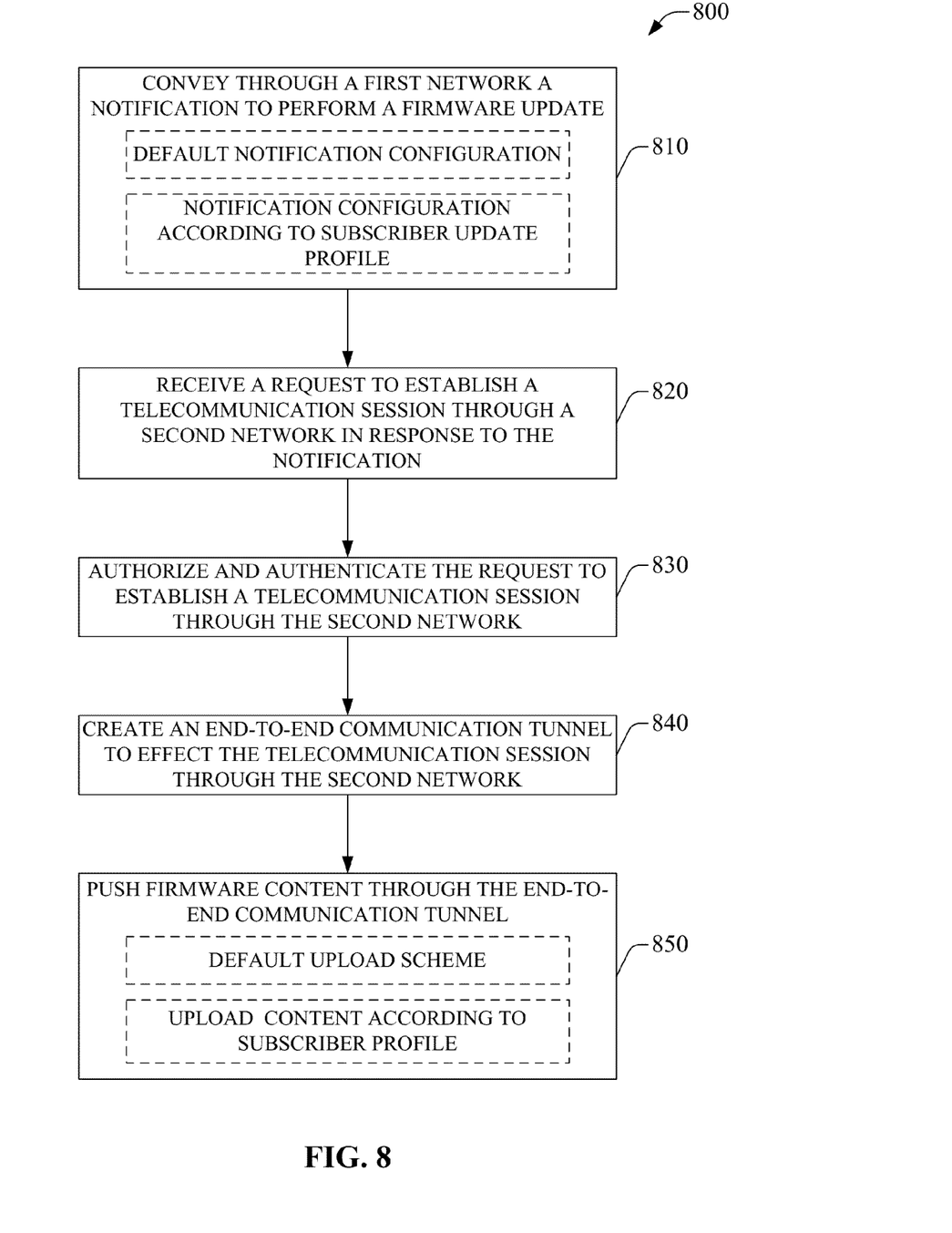
FIG. 8 presents a flowchart of an example method for delivering firmware content in accordance with aspects of the subject innovation.

FIG. 8 presents a flowchart of an example method 800 for delivering firmware content, or substantially any other content, from a serving first network through an offloading second network in accordance with aspects described herein. At act 810, a notification to perform a firmware update is conveyed through a first network. The notification can be substantially any message type supported by the first network. For example, the notification can be a SMS communication, a MMS message, an email message, an instant message, a predetermined ringtone or sound, and the like. In addition, the notification can be a low-level type of indication like a P-bit word (P is a positive integer) conveyed in control channel or a packet header field. For high-level notification(s), the specific format utilized can be based on available audiovisual resources (e.g., display size) of a device (e.g., multimode access terminal 250), or applications in the device. In addition, the format can be determined through a network-configured default format which can be established through firmware at the time the device is assembled or when a subscriber account is setup for the device. Moreover, the notification format can be configured through a subscriber update profile, which can be a part of a general operation profile setup by a subscriber. Such an update profile can determine time intervals during which notification are allowed. The profile can also configure priorities for notifications and formats thereof; e.g., firmware updates can be allowed at any time through a MMS message, whereas assistant-type applications (e.g., calendar, scheduler, touch-pad application(s)) can be permitted within specific hours like during weekends via a ringtone or a low-level batch mode notification as described hereinbefore.

At act 820, a request is received to establish a telecommunication session through a second network in response to the notification. In an aspect, such request is received via a tunnel interface in the first network (e.g., tunnel interface 226, which can be TTG in a 3GPP UMTS network). At act 830, the request to establish a communication session through the second network is authorized and authenticated via, for example, the tunnel interface in combination with a gateway component (e.g., gateway node(s) 218, which can be a GGSN in a 3GPP UMTS network) in the first network. At act 840, an end-to-end communication tunnel is created to effect telecommunication session through the second network.

At act 850, updated firmware content is uploaded through the end-to-end communication tunnel. Utilization of the end-to-end tunnel has at least the advantage to offload traffic, e.g., firmware content which can be in excess of a MB, from the first network. In an aspect, firmware content can be uploaded according to a network-configured default scheme, or to a subscriber profile. For example, a default scheme can provide a subscriber station with firmware updates consistent with application(s) extant in the mobile or to ensure specific functionality agree at the time of subscription to a service. Alternatively, or in addition, uploads through a subscriber profile can deliver a subscriber with add-on updates that enhance the functionality of the subscriber station when in the profile the subscriber indicated that firmware upgrades and add-ons are to be prompted for download.

Figure 9:
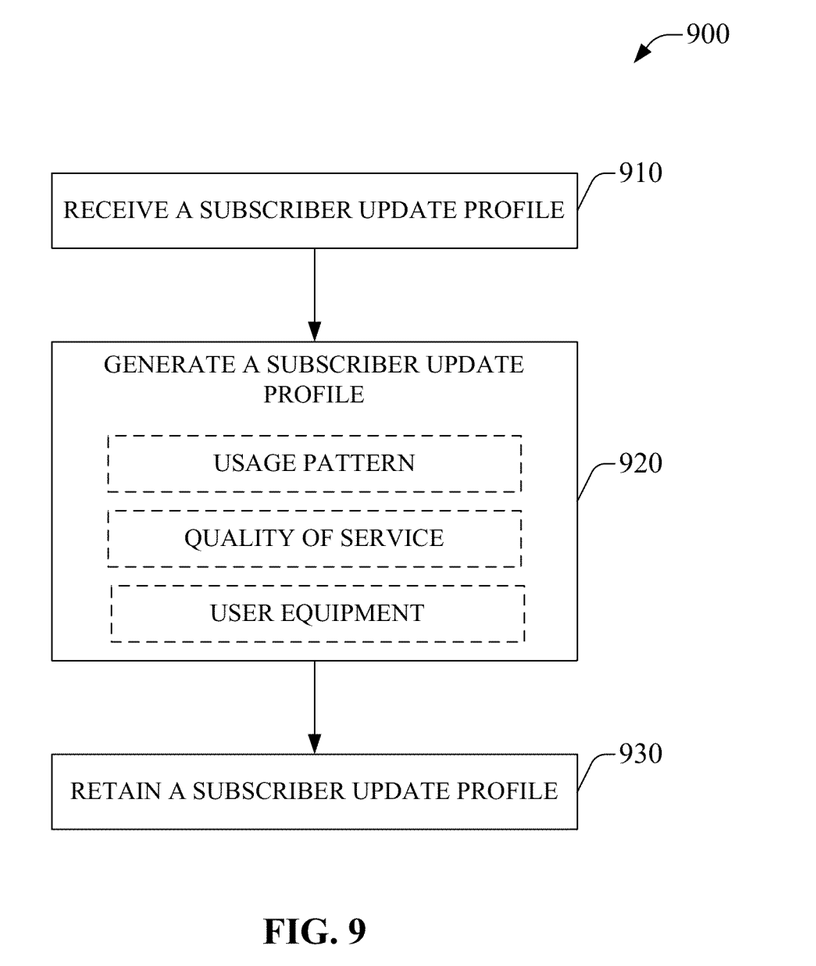
FIG. 9 presents a flowchart of an example method for configuring a subscriber update profile according to aspect described herein.

FIG. 9 presents a flowchart of an example method 900 for configuring a subscriber update profile according to aspect described herein. At act 910 a subscriber update profile is received. A subscriber update profile can establish various preferences regarding notification to conduct (e.g., download and install) a firmware update. In an aspect, the subscriber update profile can be generated as a default profile when a subscriber's account is opened. For example, a default subscriber update profile can indicate that security and operational firmware updates are to be notified when available for download and installation, while updates for non-critical applications such as video- and music-streaming, gaming, scheduling and calendar, etc. are to be notified periodically rather than upon immediate availability. A subscriber generated update profile can be substantially richer, with specific priorities for various applications and security features, in addition to allowing offerings for add-on features, e.g., notification to download firmware that expands the capability of the subscriber station such as drivers to render a mobile display into a television tuner or into a touch-pad display.

At act 920 a subscriber update profile is generated. A network operator can generate a profile according to various aspects like agreed quality of service (e.g., guaranteed bitrate, minimum bitrate, minimum tolerable latency, maximum bit error or packet loss rate, and so forth), user equipment capabilities like antenna configuration, multimode chipset(s) features, multi-processor processing unit(s), and so on. In addition, an update profile can be generated autonomously by the a network component (MDM component 214) based at least in part on a subscriber pattern of usage of a second network utilized for uploading firmware content into a mobile station. Accordingly, notification(s) to update firmware can be conveyed when the first network has a substantive confidence a subscriber station can be in a coverage area of the second network. It should be appreciated that such update profile inference can be implemented when the first network and second network are operated by a same service provider, since the service provides can collect subscriber's location information and correlate such information with access points that provide coverage through the second network. Moreover, when service provider operates the second network, it can ensure free-of-charge updates for a subscriber since access to the second network need not be rated. At act 930, a subscriber update profiled is retained for at least mobile device management.

It should be appreciated that the specification described herein can be implemented through program modules stored in a memory and executed by a processor, and/or other combination of hardware and software, e.g., firmware.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; femto cell configuration (e.g., devices served by a femto AP; access control lists, or white lists) or service policies and specifications; privacy policies; add-on features, geographical location tolerances, and so forth. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

What has been described above includes examples of systems and methods that provide advantages of the subject innovation. It is, of course, not possible to describe every conceivable combination of components or methodologies for purposes of describing the subject innovation, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
    a memory to store instructions; and
    a processor, coupled to the memory, that facilitates execution of the instructions to perform operations comprising:
        identifying a network device of a set of network devices available to download a software component to a mobile device;
        determining a period of time at which the mobile device is expected to be within a coverage area of the network device of the set of network devices based on a first historical usage pattern associated with the mobile device;
        determining an expected operating condition of the network device during the period of time based on a second historical usage pattern associated with the network device; and
        in response to the expected operating condition being determined to be enabling for the download of the software component during the period of time, facilitating the download of the software component to the mobile device via the network device during the period of time.

2. The system of claim 1, wherein the software component is a firmware update.

3. The system of claim 1, wherein the operations further comprise sending a notification to the mobile device of an availability of the software component.

4. The system of claim 3, wherein the sending the notification comprises sending the notification via another network device distinct from the set of network devices.

5. The system of claim 1, in response to the expected operating condition being determined not to be enabling for the download of the software component during the period of time:
    selecting an alternate software component; and
    facilitating download of the alternate software component to the mobile device via the network device during the period of time.

6. The system of claim 4, wherein the other network device comprises a cellular device.

7. The system of claim 1, wherein the network device communicates according to a wireless communication protocol.

8. The system of claim 4, wherein a first available bandwidth of the network device is determined to exceed a second available bandwidth of the other network device.

9. The system of claim 1, wherein the first historical usage pattern comprises respective locations of access point devices to which the mobile device has connected and respective lengths of times of connections between the access point devices and the mobile device.

10. The system of claim 1, wherein the expected operating condition is an expected quality of communications of the network device.

11. A method comprising:
    identifying, by a system comprising a processor, an access network device available to download a software module to a mobile device;
    determining, by the system, a period of time at which the mobile device is expected to be within a coverage area of the access network device based on a first historical usage pattern associated with the mobile device;
    determining, by the system, an expected operating condition of the access network device during the period of time based on a second historical usage pattern associated with the access network device; and
    in response to the expected operating condition being determined to satisfy a criterion that enables the download of the software module during the period of time, initiating, by the system during the period of time, the download of the software module to the mobile device via the access network device during the period of time.

12. The method of claim 11, wherein the software module is a firmware update.

13. The method of claim 11, further comprising, in response to the expected operating condition being determined not to satisfy the criterion that enables the download of the software module during the period of time,
    selecting, by the system, an alternate software module; and
    initiating, by the system at the start of the period of time, download of the alternate software module to the mobile device on the access network device during the period of time.

14. The method of claim 11, further comprising notifying, by the system via another access network device different from the access network device, the mobile device of an availability of the software module.

15. The method of claim 11, wherein the first historical usage pattern comprises locations of access point devices to which the mobile device has connected and lengths of times of connections between the access point devices and the mobile device.

16. The method of claim 15, wherein the expected operating condition relates to a quality of communications received from the access network device.

17. A computer-readable storage device, comprising computer executable instructions that, in response to execution, cause a system comprising a processor to perform operations comprising:
- inferring a period of time that a mobile device is expected to be within a coverage area of a network device, available to download a software program, based on a first historical usage pattern associated with the mobile device;
- inferring an expected operating condition for the network device during the period of time based on a second historical usage pattern associated with the network device; and
- in response to the expected operating condition being determined to be capable of downloading the software program during the period of time, facilitating, by the system, the download of the software program to the mobile device via the network device during the period of time.

18. The computer-readable storage device of claim 17, wherein the operations further comprise, in response to the expected operating condition being determined not to be capable of downloading the software program during the period of time:
- selecting an alternate software program; and
- facilitating download of the alternate software program to the mobile device via the network device during the period of time.

19. The computer-readable storage device of claim 17, wherein the network device is a first network device, and the operations further comprise notifying, via a second network device distinct from the first network device, the mobile device of an availability of the software program.

20. The computer-readable storage device of claim 19, wherein the first historical usage pattern comprises respective locations of access point devices to which the mobile device has connected and respective lengths of times of connections between the access point devices and the mobile device.

* * * * *